(12) United States Patent
Rubinstein

(10) Patent No.: US 9,844,171 B1
(45) Date of Patent: Dec. 19, 2017

(54) STEEL HANDLE SHOVEL

(71) Applicant: Truper, S.A. de C.V., Estado de México (MX)

(72) Inventor: Arie Jusidman Rubinstein, Estado de México (MX)

(73) Assignee: TRUPER, S.A. DE C.V., Estado de México (MX)

( * ) Notice: Subject to any disclaimer, the term of this patent is extended or adjusted under 35 U.S.C. 154(b) by 0 days.

(21) Appl. No.: 15/640,377

(22) Filed: Jun. 30, 2017

(51) Int. Cl.
*A01B 1/02* (2006.01)
*A01B 1/22* (2006.01)

(52) U.S. Cl.
CPC . *A01B 1/02* (2013.01); *A01B 1/22* (2013.01)

(58) Field of Classification Search
CPC .... A01B 1/00; A01B 1/02; A01B 1/20; A01B 1/22; A01D 9/00; A01D 11/00

USPC ........................ 294/49, 51, 57–58
See application file for complete search history.

(56) References Cited

U.S. PATENT DOCUMENTS

| | | | | |
|---|---|---|---|---|
| 4,718,708 A | * | 1/1988 | Zacuto | A01B 1/22 294/49 |
| 5,097,909 A | * | 3/1992 | Jauhal | A01B 1/227 15/235.4 |
| 5,310,230 A | * | 5/1994 | Carmien | B25G 3/12 294/49 |
| 5,699,700 A | | 12/1997 | Carmien | |
| 7,878,334 B2 | | 2/2011 | Tucker | |
| 8,291,996 B2 | * | 10/2012 | Hoang | A01B 1/12 172/375 |

* cited by examiner

*Primary Examiner* — Stephen A Vu
(74) *Attorney, Agent, or Firm* — Martin & Ferraro, LLP

(57) ABSTRACT

There is provided a steel handle shovel comprising a coupling assembly between the head shovel and the handle, which provides a higher resistance in the structure of the shovel to the force and the weight the shovel undergoes under working conditions.

20 Claims, 4 Drawing Sheets

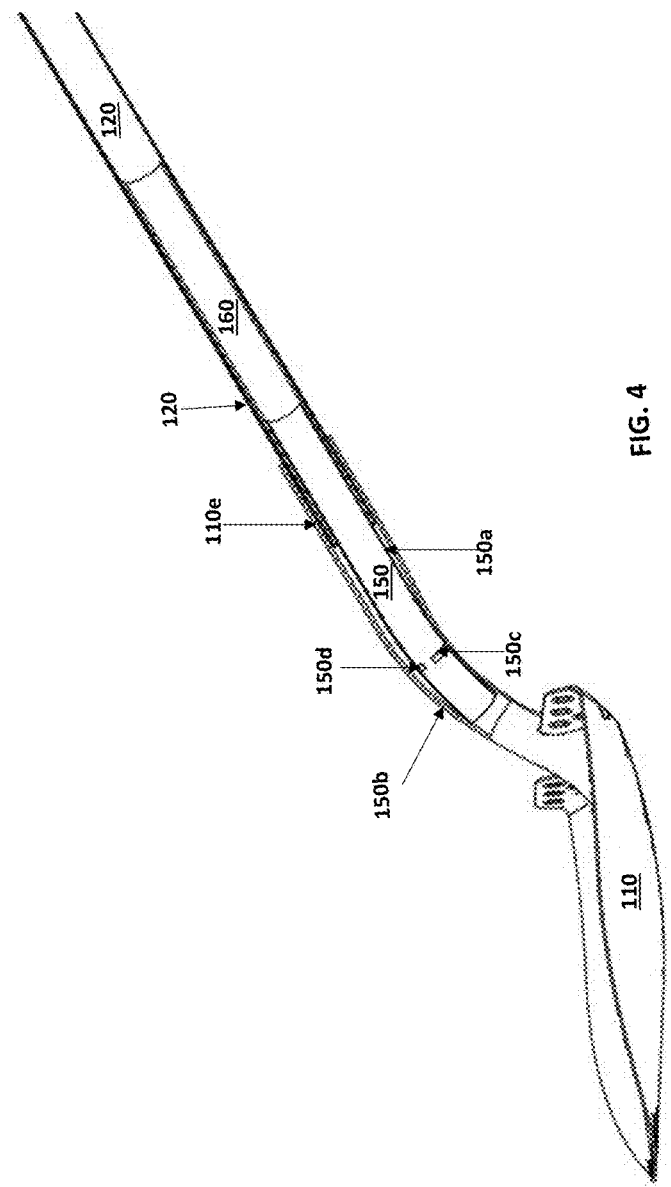

STEEL HANDLE SHOVEL

FIELD OF THE INVENTION

The present invention refers to a steel handle shovel comprising a coupling assembly that reinforces the structure thereof through the arrangement and elements that integrate same.

BACKGROUNDS OF THE INVENTION

A shovel is basically a hand tool used in different tasks such as construction, gardening, cleaning, etc., which has two primary functions: manually digging or moving materials from one place to another.

In general, a shovel comprises two main elements: a shovel blade be made up of a sheet or plate on the bottom end of the shovel that usually it is rectangular and slightly concave element and made of metal; and the handle or stub on the top end of the shovel to manipulate said tool. The shape of the shovel blade, as well as certain characteristics of the handle, depend on the type of task to be performed with this tool.

The use of shovel with steel handles is known in the prior art. Specifically, coupling means that attach the handle with the shovel. However, these means lose their physical properties with the use until they break. Said coupling means commonly consist of screws or rims as in the shovel described in U.S. Pat. No. 5,699,700.

As mentioned before, a shovel comprises a handle and a shovel blade; wherein one of the ends of the shovel blade includes a coupling neck through which the handle of said shovel is inserted attached thereto by fastening means. In the practice, the area where these elements are coupled is a critical point of fracture, as said area undergoes a force pressure exerted by the user; as well as to the load weight that the shovel undergoes during its use. Thus, the neck of the shovel blade, the coupling means or the handle itself tends to fracture over time. For example, U.S. Pat. No. 7,878,334 B2 discloses a shovel including a handle and a shovel blade, wherein said elements are coupled through a plurality of mechanical fasteners, such as metal screws that are attached in a first end of the handle to the shovel blade and a second end of the handle includes a grip. However, said shovel becomes fractured as the end of the handle, as well as the coupling portion of the shovel blade comprise a series of bores for the coupling thereof using screws as fastening means between both elements, thus, the coupling is weaker.

In this sense, the steel handle shovel according to the present invention, differs substantially in its coupling assembly design from the elements that comprise same with respect the conventional ones already known in the prior art.

The steel handle shovel solves the mentioned problems as it is designed with a minimum of elements which allow to distribute the force exerted by the user or the weight in working conditions, in different areas of the handle and the shovel blade; and not just in one area, making the shovel with steel handle of the present invention more resistant unlike shovels already known in the prior art.

The present invention aims to provide a steel handle shovel having a coupling assembly that further serves as reinforcement means of the shovel with steel handle; wherein said coupling assembly provides the shovel with a higher resistance to the forces and the weight it undergoes under working conditions.

Therefore, the embodiment of the invention described herein comprises a combination of technical features and benefits that substantially improve the shovel with steel handle of the prior art. These and many other features and advantages of the invention will be readily apparent to those skilled in the art upon reading the detailed description of the invention, making reference to the enclosed drawings.

SUMMARY OF THE INVENTION

In view of the drawbacks related to the before cited shovel with steel handles of the prior art. The present invention provides a steel handle shovel with improvement in the coupling assembly of the elements thereof, which provides a higher resistance to each of the elements comprising the shovel to the force and the weight the shovel undergoes in working conditions.

The present invention comprises a shovel blade consisting of a sheet or plate on the bottom end that usually is a metal, rectangular, and concave element, which at its top end comprises a tubular neck forming a single body; and a long handle which is assembled to the tubular neck of the shovel blade through a coupling and reinforcement assembly which consists of a first connecting member, a second connecting member and a locking element; wherein said members as well as the long handle are hollow tubular elements.

The tubular neck of the shovel blade is gradually extended with a bending forming a hollow portion, which comprises an inner diameter that is substantially equal to the outer diameter of the long handle. Furthermore, the first connecting member is sized so that one end is inserted and fitted within the inner diameter of the second connecting member and its other end is inserted into the inner diameter of the tubular neck of the shovel blade; the second connecting member is sized to be inserted and fitted into the inner diameter of the long handle; further wherein the locking element is sized to fit over the outer surface of the top end of the tubular neck of the shovel blade.

The following description is directed to an exemplary embodiment. However, a person skilled in the art will understand that the examples herein presented have a broad application, and that the discussion of any embodiment is relevant solely to be exemplary of said embodiment, and is not intended to suggest that the scope of the specification, including the claims, is limited to that embodiment.

Certain terms are used throughout the following specification and claims to refer to particular features or components. As a person skilled in the art shall appreciate, different people may refer to the same feature or component using different names. This document is intended to distinguish between components or features that differ in name, but not in function. The figures in the drawings are not necessarily to scale. Some of the features and components in the present document, may be shown exaggerated in scale or in some schematic form, and some details of the conventional elements may not be shown for the sake of clarity and conciseness.

BRIEF DESCRIPTION OF THE DRAWINGS

For a detailed description of the preferred embodiments of the invention, reference will be made to the attached drawings wherein:

FIG. 4 shows a cut-off perspective side view of the preferred embodiment of the steel handle shovel of the present invention.

DETAILED DESCRIPTION OF THE PREFERRED EMBODIMENTS

The present invention refers to a steel handle shovel comprising, in its bottom end, a shovel blade consisting of relatively rectangular and concave shaped sheet or plate, which may be made in metal or plastic, wherein its top end comprises a tubular neck forming a single body. The top end of the shovel with steel handle comprises a long handle; wherein the bottom end of the long handle is assembled to the tubular neck of the shovel blade through a coupling and reinforcement assembly; and wherein its top end comprises a handle grip made in plastic but not limited to said material, which provides the user a better grip and comfort during its use.

Figure 1:
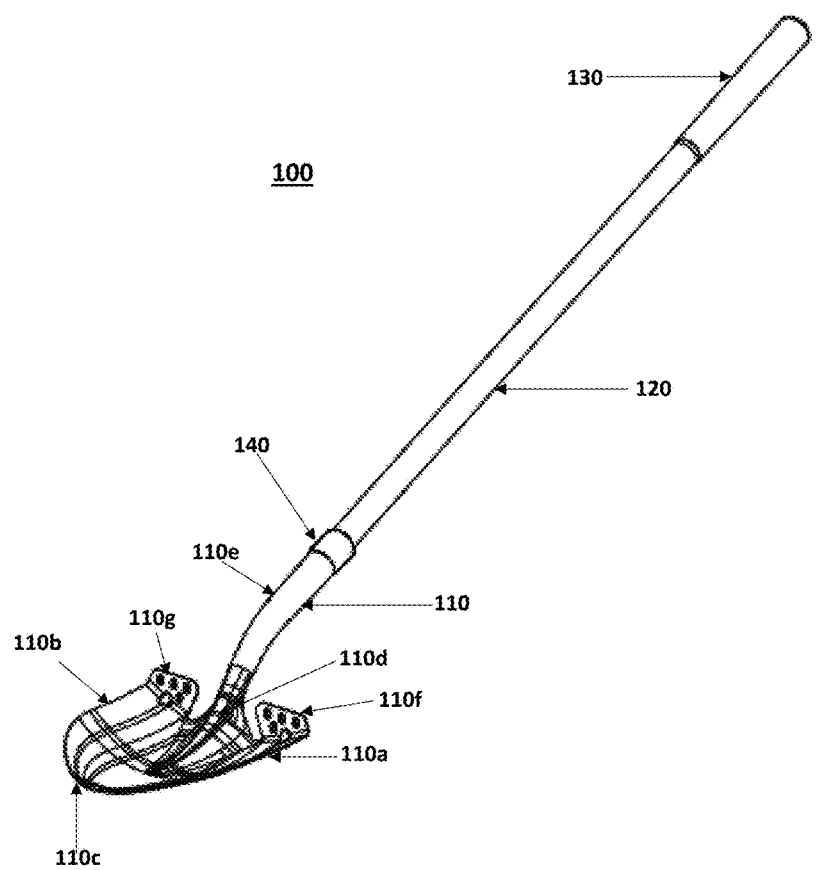
FIG. 1 shows a perspective side top view of the preferred embodiment of the steel handle shovel of the present invention.

Referring to FIG. 1 which illustrates a perspective side top view of the steel handle shovel 100 according to the present invention. The shovel 100 comprises a shovel blade 110 and a long handle 120. The shovel blade 110 consists of a substantially rectangular shaped sheet or plate consisting of a single body; wherein its side ends 110a and 110b are curvedly extended from the center of the sheet or plate, forming a concave surface and a bottom end 110c is projected towards the front forming a concave oval surface.

A neck curvedly extends from the central part of the substantially rectangular shaped and concave sheet or plate towards the top end 100d of the shovel blade 110, forming a hollow tubular neck 110e; wherein the top end 110d of the shovel blade 110 at the sides of the hollow tubular neck 110e, comprises a pair of side walls 110f and 110g which are parallel therebetween; wherein said side parallel walls 110f and 110g are perpendicularly extended in reference to the surface of the sheet or plate of the shovel blade 110, forming two barriers. The side walls 110f and 110g comprise at least one hole which function is to provide an anti-slip and thrust surface such that it facilitates the operations of digging and transfer of materials.

The long handle 120 consists of a tubular element wherein its top end comprises a handle grip 130 that is coupled in the outer surface of the long handle 120, which is made of a non-metal material such as a soft and corrugated material to provide better grip and comfort, for example, plastic, but not limited thereto; wherein the handle grip 130 is inserted over the outer surface of the top end of the long handle 120.

The bottom end of the long handle 120 is inserted into the top end of the hollow tubular neck 110e of the shovel blade 110 and is fixed through a coupling and reinforcement assembly (not shown in FIG. 1). Thus, the inner diameter of the top end of the hollow tubular neck 110e is substantially equal to the outer diameter of the long handle 120; wherein a locking element 140 fits over the outer surface of the top end of the hollow tubular neck 110e to reinforce and lock the coupling between the long handle 120 and the shovel blade 110.

Figure 2:
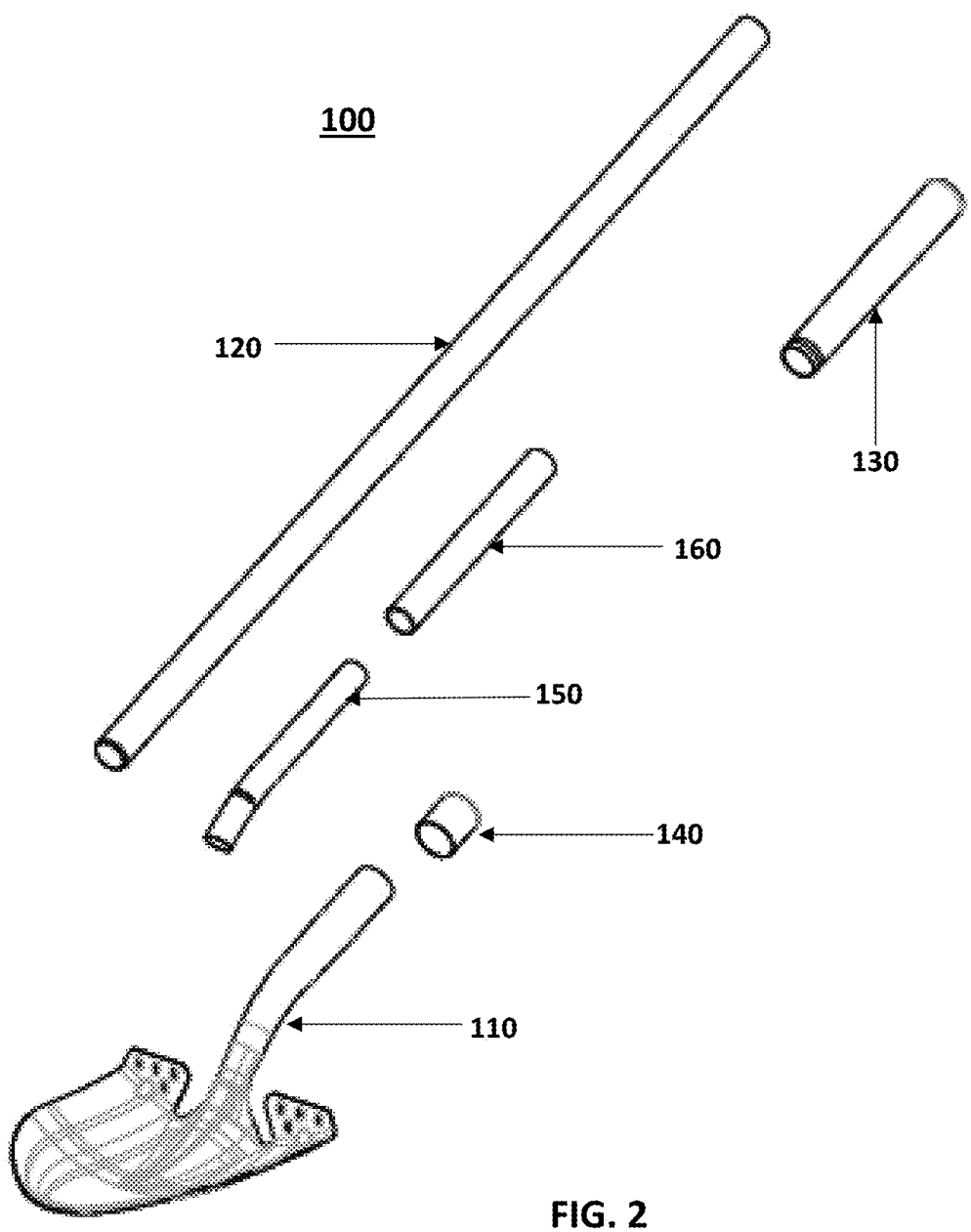
FIG. 2 shows an exploded perspective side top view of the preferred embodiment of the steel handle shovel of the present invention.

Referring to FIG. 2, which shows an exploded perspective side top view of the preferred embodiment of the shovel with steel handle of the present invention. The hollow tubular neck 110 of the shovel blade 110e is gradually curvedly extended, forming a hollow tubular portion wherein the bottom end of the long handle and the coupling and reinforcement assembly of the shovel with steel handle 100 of the present invention are coupled.

The coupling and reinforcement assembly according to the embodiment of the present invention, comprises a first connecting member 150 which, in one of its ends, comprises a fold or bending and in its opposite end it is lineal; wherein the shape of said bending is similar to the bending of the hollow tubular neck 110e of the shovel blade 110. Said first connecting member 150 is sized so that one part of its linear end is inserted inside a second connecting member 160 and; wherein the outer surface is covered with an epoxy resin film during the assembling process, which allows for said lineal end to be fitted to the inside of the second connecting member 160, which further allows for the connection between both connecting members 150, 160. Furthermore, the opposite end of the first connecting member 150 comprising a bending is inserted inside the hollow tubular neck 110e of the shovel blade 110.

The second connecting member 160 has a smaller length than the length of the long handle 120, wherein the connecting member 160 is sized to be inserted and fitted inside the long handle 120; wherein the outer diameter of the second connecting member 160 is substantially the same than the inner diameter of the long handle 120; wherein all or at least part of the outer surface of the second connecting member 160 is covered with epoxy resin film during the assembling process, which allows for the second connecting member 160 to be fitted to the inner diameter of the long handle 120, further achieving the connection between said elements.

The handle grip 130 is a tubular element preferably made of a non-metal material, wherein its bottom end is hollow and comprising in its top end a wall in such a shape that when the handle grip 130 is fixed over the outer surface of the top end of the long handle 120, said wall delimits the position in which the handle grip shall be positioned on the long handle 120, thereby preventing the handle grip 130 from slipping over the entire longitudinal axis of the long handle 120.

Still referring to FIG. 2, the locking element 140 comprises a smaller length and an inner diameter equal or substantially equal than the outer diameter of the hollow tubular neck 110e of the shovel blade 110; wherein said locking element 140 reinforces the coupling between the long handle 120 and the shovel blade 110.

Figure 3:
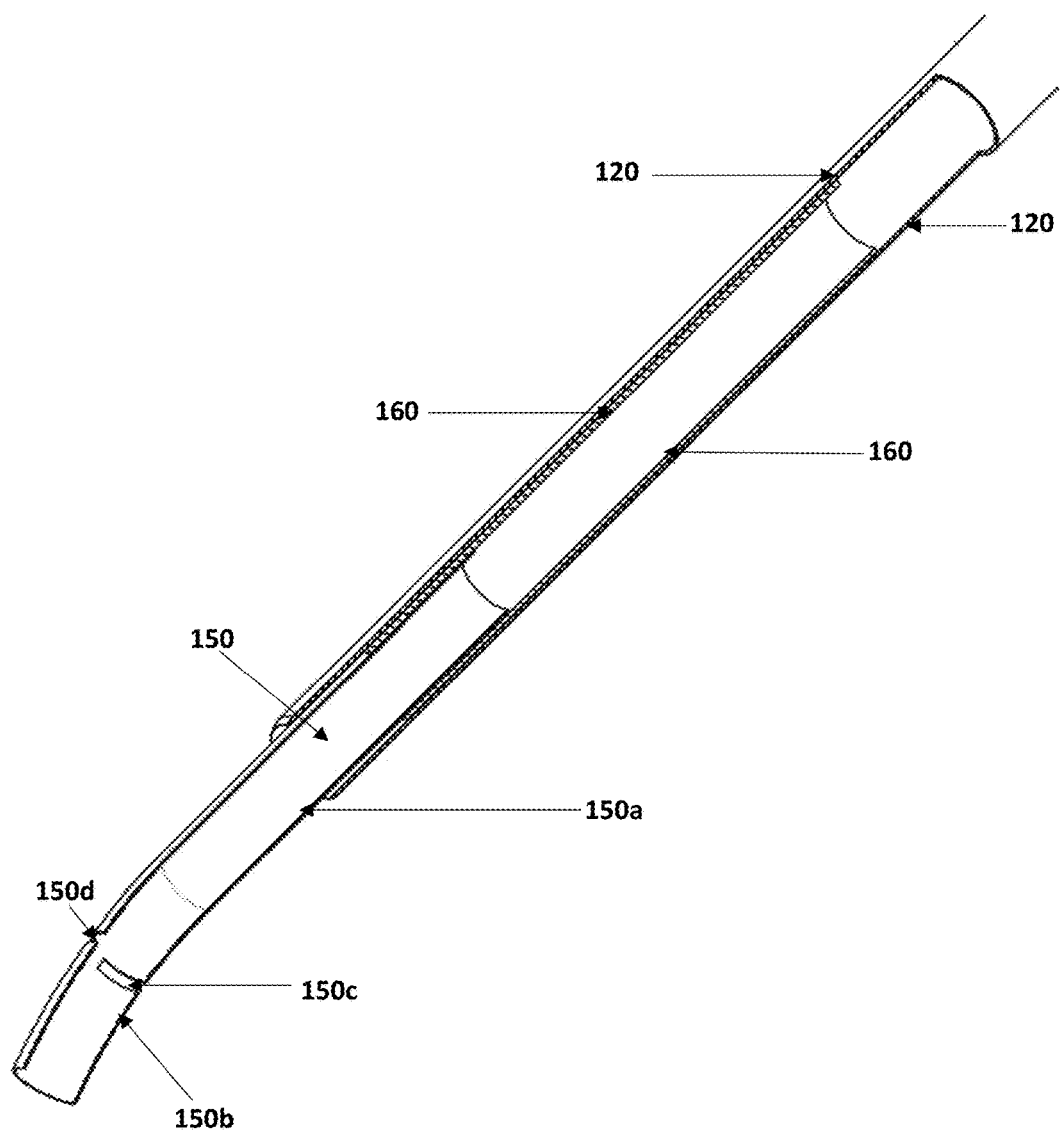
FIG. 3 shows a cut-off perspective side view of the coupling and reinforcement assembly inside the long handle of the steel handle shovel of the present invention.

Referring to FIG. 3, it is shown a cut-off side perspective view of the coupling and reinforcement assembly inside the long handle 120 of the shovel with steel handle 100 of the present invention, before being inserted and fixed to the tubular neck of the shovel blade 110 (not shown); wherein the outer surface of the second connecting member 160 is covered with an epoxy resin film and is inserted inside the inner diameter of the long handle 120; wherein the epoxy resin film allows for the connection between the second connecting member 160 and the long handle 120.

Furthermore, a portion of the lineal end 150a of the first connecting member 150 is covered with an epoxy resin film and is inserted inside the inner diameter of the second connecting member 160; wherein the epoxy resin film allows for the fitting and connection of the lineal end 150a of the first connecting member 150 within the second connecting member 160; wherein the remaining portion of the lineal end 150a and the bending end 150b of the first connecting member 150 remain out of the inner diameter of the second connecting member 160 and the long handle 120.

As shown by FIG. 3, the bending end 150b of the first connecting member 150 comprises a pair of slots 150c and 150d which provide the first connecting member 150 with a slight flexibility to be inserted deeper inside the tubular neck 110e of the shovel blade 110 (not shown).

According to the preferred embodiment of the present invention, the long handle 120, the first connecting member 150 and the second connecting member 160 consist of tubular steel elements.

Referring to FIG. 4, which shows a cut-off perspective side view of the preferred embodiment of the shovel with steel handle of the present invention. The bottom end of the long handle 120 is inserted inside the tubular neck 110e of the shovel blade 110. According to FIGS. 3 and 4, the second connecting member 160 is inserted inside the inner diameter of the long handle 120 and a portion of the lineal end 150a of the first connecting member 150 is located inside the inner diameter of said second connecting member 160.

Furthermore, inside the pocket of the tubular neck 110e of the shovel blade 110, there is provided the remaining portion of the lineal end 150a and the bending end 150b of the first connecting member 150. The bending end 150b of the first connecting member 150 is fixed inside the bending of the neck 110e of the shovel blade 110. Therefore, the slots 150c and 150d of the first connecting member 150 allow for a slight folding at the bending end 150b of the first connecting member 150 to be inserted deeper inside the inner diameter of the neck 110e of the shovel blade 110, thus reinforcing part of the hollow tubular neck 110e of the shovel blade 110.

So, the force applied by a user, as well as the weight during use of the shovel with steel handle of the present invention, is distributed not only at the coupling point between the long handle 120 and the hollow tubular neck 110e of the shovel blade 110, but also at the first and second connecting members 150 and 160. Particularly, the second connecting member 160 reinforces much of the length of the bottom end of the steel handle 120 an, in turn, the first connecting member 150 reinforces part of the tubular neck 110e of the shovel blade 110.

According to the previously described coupling and reinforcement assembly of the shovel with steel handle of the present invention, each and all of the elements and members that comprise same are coupled through the insertion between said elements, so there no other kinds of tools are required for the assembly between the long handle 120 and the shovel blade 110, which makes the assemble thereof more practical.

Although a preferred embodiment of the invention has been shown and described, a person skilled in the art may modify the same without departing from the scope or the teachings herein. The embodiments herein described are merely exemplary and not limitative, as in the present shovel with steel handle a different form of sheet or plate of the shovel blade may be used. In addition, it is also possible to provide, in the top end, any other handle grip having the same purpose. As a result, the scope of protection is not limited to the embodiment herein described, but it is only limited by the following claims, which scope will include all the equivalents of the subject matter of the claims.

What is claimed is:
1. A steel handle shovel comprising:
  a shovel blade having a hollow tubular neck extending therefrom, the hollow tubular neck being curved at least in part;
  a long handle having a top end, an outer surface, an inner diameter, an outer diameter, and a bottom end being tubular, the bottom end of the long handle adapted to be coupled to the hollow tubular neck of the shovel blade;
  a coupling and reinforcement assembly that couples the bottom end of the long handle and the hollow tubular neck of the shovel blade comprising:
  a first connecting member having a first end and an opposite second end, the first end being linear and the opposite second end including a fold or a bend, a portion of the linear first end and the opposite second end of the first connecting member being sized to be inserted and fixed inside a bend of the hollow tubular neck of the shovel blade;
  a second connecting member having an inner diameter, the second connecting member being sized to be inserted and fitted inside the bottom end of the long handle; and
  a locking element that is fixed over an outer surface of a top end of the hollow tubular neck of the shovel blade, the locking element reinforcing the coupling between the bottom end of the long handle and the hollow tubular neck of the shovel blade,
  wherein the first connecting member is sized so that a portion of the linear first end is inserted and fitted inside the inner diameter of the second connecting member and the opposite second end is inserted inside the hollow tubular neck of the shovel blade.

2. The steel handle shovel according to claim 1, wherein the second connecting member has an outer surface covered with a first epoxy resin film and is inserted inside the inner diameter of the long handle; and wherein the first epoxy resin film allows for a fitting and connection of the second connecting member within the inner diameter of the long handle.

3. The steel handle shovel according to claim 1, wherein a portion of the linear first end of the first connecting member is covered with a second epoxy resin film and is inserted inside the inner diameter of the second connecting member; and wherein the second epoxy resin film allows for a fitting and connection of the first connecting member within the inner diameter of the second connecting member.

4. The steel handle shovel according to claim 3, wherein the remaining portion of the linear first end and the opposite second end of the first connecting member remain outside the inner diameter of the long handle and the second connecting member.

5. The steel handle shovel according to claim 1, wherein the shovel blade consists of a substantially rectangular-shaped sheet or plate of a single body; and wherein the shovel blade includes sides that are curvedly extended from the center of the sheet or plate, forming a concave surface and a bottom end that projects from the shovel blade forming a concave oval surface.

6. The steel handle shovel according to claim 1, wherein the top end of the shovel blade comprises, towards sides of the hollow tubular neck, a pair of side walls parallel therebetween, which are perpendicularly extended to the surface of the sheet or plate of the shovel blade, forming two barriers.

7. The steel handle shovel according to claim 6, wherein the pair of side walls each comprise at least one hole to provide an anti-slip and thrust surface such that the pair of side walls facilitates digging and transfer of materials.

8. The steel handle shovel according to claim 1, wherein the top end of the long handle comprises a handle grip made of a non-metal material.

9. The steel handle shovel according to claim 8, wherein a bottom end of the handle grip is hollow and comprises, in a top end of the handle grip, a wall in such a shape that when the handle grip is fixed over the outer surface of the top end of the long handle, the wall delimits the position in which the handle grip can be positioned on the top end of the long handle, thereby preventing the handle grip from slipping over a longitudinal axis of the long handle.

10. The steel handle shovel according to claim 1, wherein an inner diameter of the top end of the hollow tubular neck of the shovel blade is equal or substantially equal to the outer diameter of the long handle.

11. The steel handle shovel according to claim 1, wherein the outer diameter of the second connecting member is substantially equal to the inner diameter of the long handle.

12. The steel handle shovel according to claim 1, wherein the outer diameter of the first connecting member is substantially equal to the inner diameter of the second connecting member.

13. The steel handle shovel according to claim 1, wherein the second connecting member has a smaller length than the length of the long handle.

14. The steel handle shovel according to claim 1, wherein the shape of the fold or bend of the opposite second end of the first connecting member is similar to a bend of the hollow tubular neck of the shovel blade.

15. The steel handle shovel according to claim 1, wherein a portion of the linear first end and the opposite second end of the first connecting member remain out of the inner diameter of the long handle.

16. The steel handle shovel according to claim 1, wherein the opposite second end of the first connecting member comprises a pair of slots that provide the first connecting member with a flexibility to be inserted inside the hollow tubular neck of the shovel blade.

17. The steel handle shovel according to claim 1, wherein the long handle, the first connecting member, and the second connecting member, are made of steel tubular elements.

18. A steel handle shovel comprising:
a shovel blade having a hollow tubular neck extending therefrom, the hollow tubular neck being curved at least in part;
a long handle having a top end, an outer surface, an inner diameter, an outer diameter, and a bottom end being tubular, the bottom end of the long handle adapted to be coupled to the hollow tubular neck of the shovel blade;
a coupling and reinforcement assembly that couples the bottom end of the long handle and the hollow tubular neck of the shovel blade comprising:
a first connecting member having a first end and an opposite second end, the first end being linear and the opposite second end including a fold or a bend, the opposite second end of the first connecting member comprising a pair of slots that provide the first connecting member with a flexibility to be inserted inside the hollow tubular neck of the shovel blade;
a second connecting member having an inner diameter, the second connecting member being sized to be inserted and fitted inside the bottom end of the long handle; and
a locking element that is fixed over an outer surface of a top end of the hollow tubular neck of the shovel blade, the locking element reinforcing the coupling between the bottom end of the long handle and the hollow tubular neck of the shovel blade,
wherein the first connecting member is sized so that a portion of the linear first end is inserted and fitted inside the inner diameter of the second connecting member and the opposite second end is inserted inside the hollow tubular neck of the shovel blade.

19. The steel handle shovel of claim 18, wherein the shape of the fold or bend of the opposite second end of the first connecting member is similar to a bend of the hollow tubular neck of the shovel blade.

20. The steel handle shovel of claim 18, wherein the long handle, the first connecting member, and the second connecting member, are made of steel tubular elements.

* * * * *